April 23, 1935.   S. A. SNELL   1,998,972
MECHANISM CONTROL
Filed July 8, 1931   6 Sheets-Sheet 1
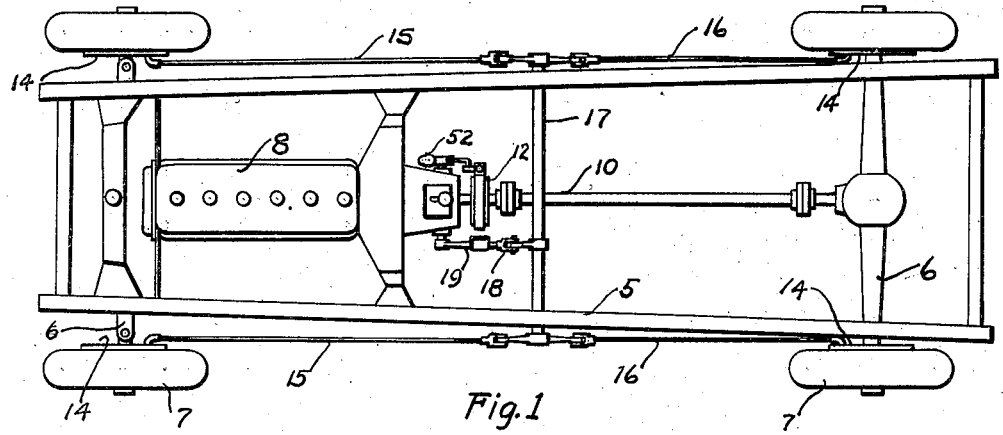
Fig. 1
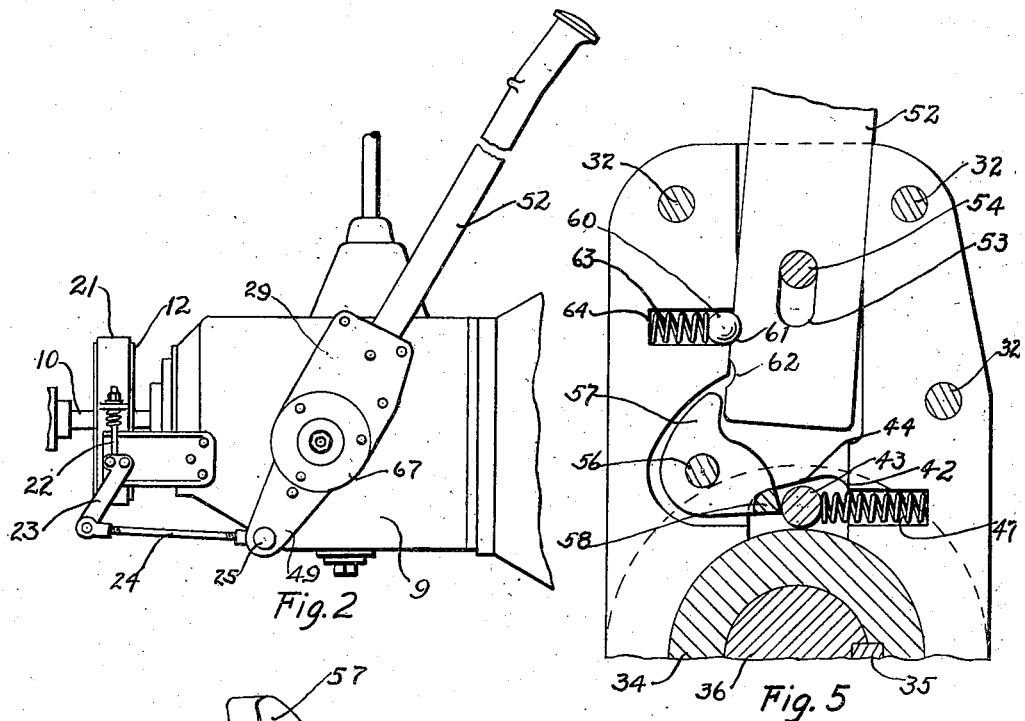
Fig. 2
Fig. 5
Fig. 6
Inventor
Samuel A. Snell
By Braselton, Whitcomb & Davies
Attorneys April 23, 1935.  S. A. SNELL  1,998,972
MECHANISM CONTROL
Filed July 8, 1931  6 Sheets-Sheet 2

Inventor
Samuel A. Snell
By Haselton, Whitcomb Davies
Attorneys.

April 23, 1935. S. A. SNELL 1,998,972
MECHANISM CONTROL
Filed July 8, 1931 6 Sheets-Sheet 3

Inventor
Samuel A. Snell
By Braselton, Whitcomb Davis
Attorneys.

April 23, 1935.  S. A. SNELL  1,998,972
MECHANISM CONTROL
Filed July 8, 1931  6 Sheets-Sheet 4

Inventor
Samuel A. Snell

April 23, 1935.  S. A. SNELL  1,998,972
MECHANISM CONTROL
Filed July 8, 1931   6 Sheets-Sheet 5

Inventor
Samuel A. Snell
By Braselton, Whitcomb Davis
Attorneys.

April 23, 1935.   S. A. SNELL   1,998,972
MECHANISM CONTROL
Filed July 8, 1931   6 Sheets-Sheet 6

Inventor
Samuel A. Snell

Patented Apr. 23, 1935

1,998,972

UNITED STATES PATENT OFFICE 1,998,972

MECHANISM CONTROL

Samuel A. Snell, Toledo, Ohio, assignor to The Bingham Stamping & Tool Company, Toledo, Ohio, a corporation of Ohio Application July 8, 1931, Serial No. 549,445

8 Claims. (Cl. 74—536)

This invention relates to control mechanism and particularly to mechanism of the type used for the controls of a motor vehicle or other apparatus.

The invention has for an object the provision of a control mechanism embodying retaining means wherein the control may be adjusted and retained in any desired position.

The invention embraces the provision of a control arrangement particularly adaptable for use in controlling the operation of braking mechanisms wherein the extent of movement of the control may vary in accordance with several factors, the arrangement being provided with means adapted to retain the same in any position of adjustment.

Another object is the provision of an arrangement wherein the same may be positively retained in any position and yet may be easily released by reason of a change in the movement of a control member.

A further object is the provision of a brake controlling mechanism or lever arrangement which embodies a lost motion connection arranged for positively locking the lever yet providing easily releasable means therefor. The invention also embraces a mounting for the control member of the lever arrangement so as to substantially eliminate vibratory movements of the operating lever or control member when the same is installed in a vehicle having a prime mover which sets up both primary and secondary harmonic vibrations which normally react upon such lever mechanism to cause excessive visible and audible vibration of the control member.

Still another object is the provision of a lever mechanism control arrangement wherein the major parts are formed from sheet material thus effecting substantial reduction in the expense of manufacture and assembly, and further embraces the uniformity and interchangeability of the parts.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which Figure 1 is a top plan view of a vehicle chassis showing one form of my invention embodied therein, Figure 2 is an enlarged fragmentary elevational view of a portion of the mechanism of a vehicle showing one form of installation of the lever mechanism of my invention, Figure 3 is an enlarged vertical sectional view through a portion of the lever arrangement of my invention, Figure 4 is a vertical sectional view taken substantially on the line 4—4 of Figure 3 showing the retaining or locking means in locked position.

Figure 5 is a view of the portion of the parts illustrated in Figure 3 showing the control member and associated mechanism in releasing position.

Figure 6 is an isometric view of one element of the construction,

Figures 7, 8:
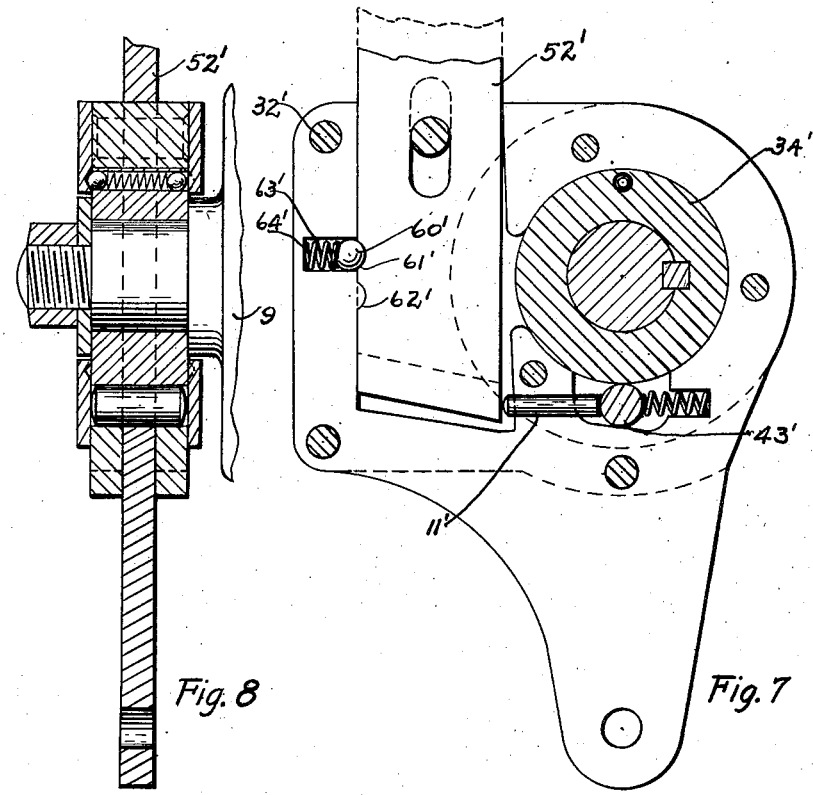
Figure 7 is a vertical sectional view showing a modified form of my invention.
Figures 9, 10, 11, 12:
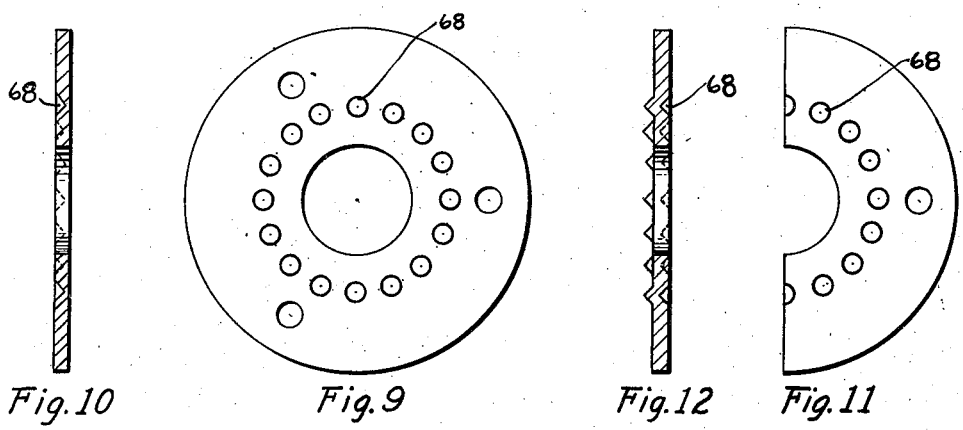
Figure 14:
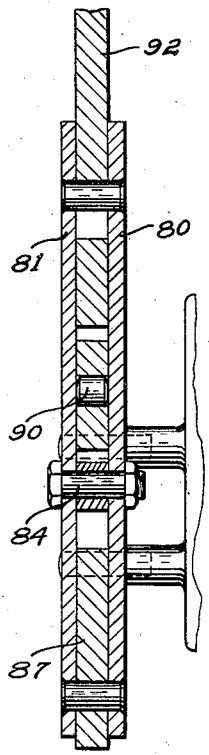
Figure 13:
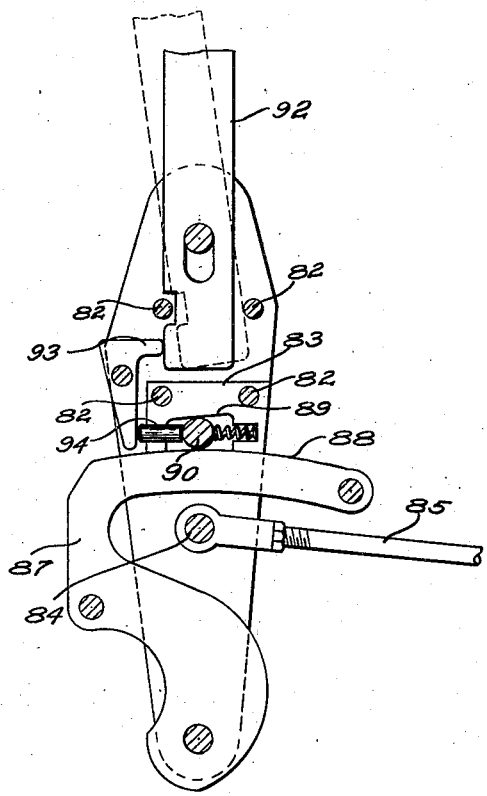
Figure 16:
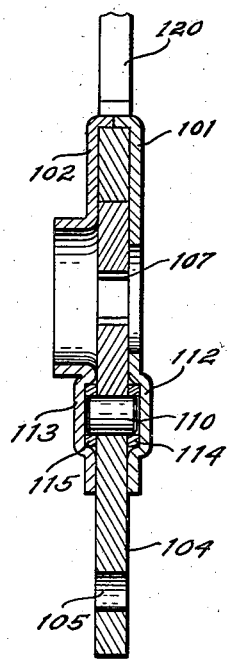
Figure 15:
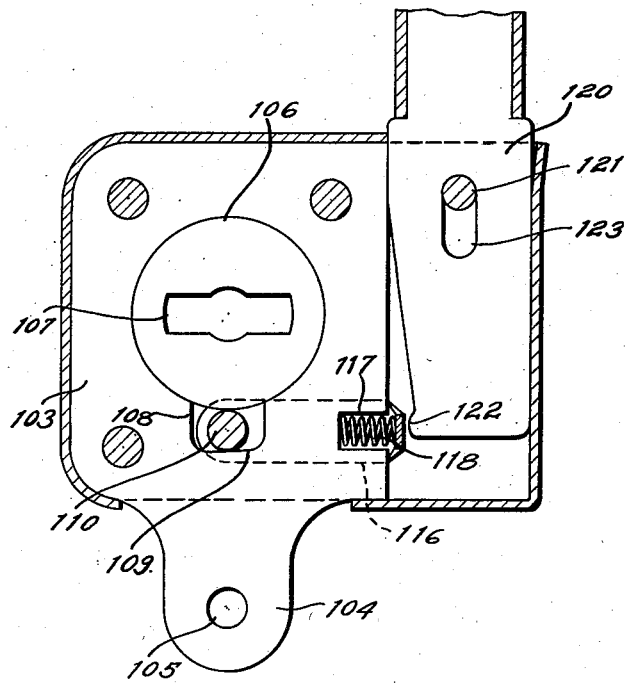
Figure 17:
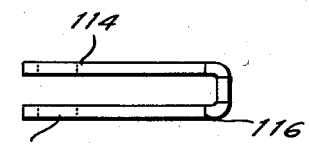
Figures 18, 19:
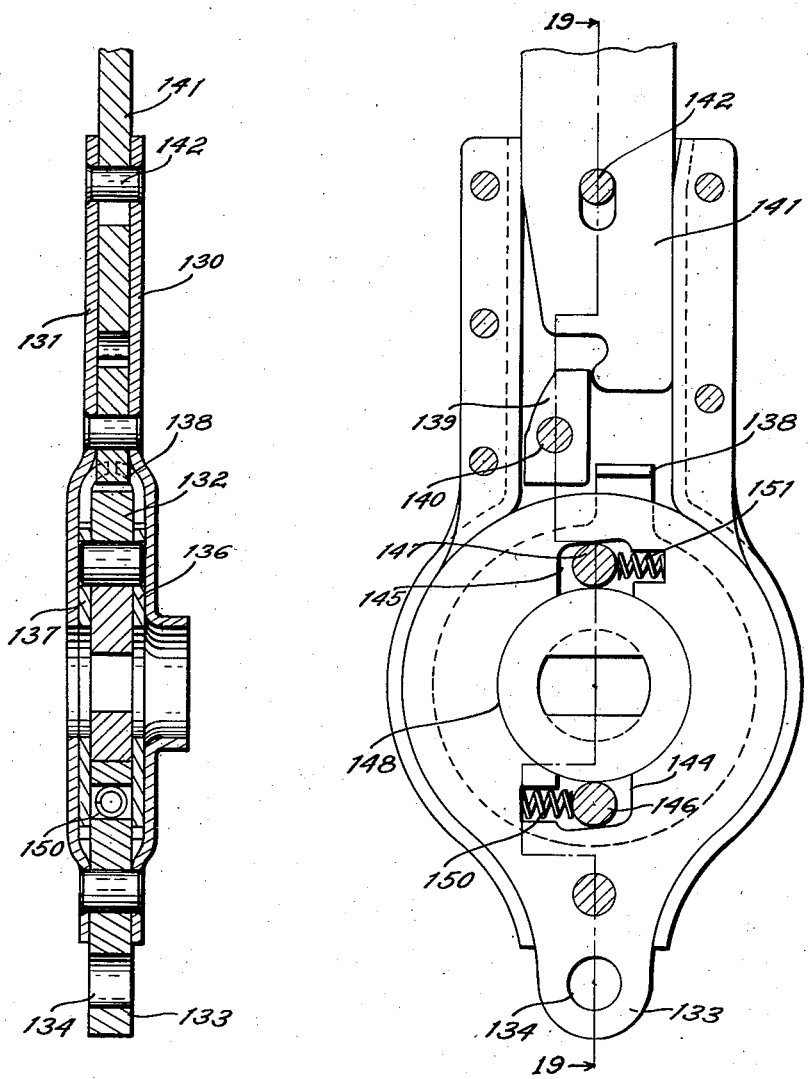

Figure 8 is a vertical sectional view taken substantially on the line 8—8 of Figure 7, Figure 9 is a detailed view of a plate forming an element of my invention, Figure 10 is a sectional view taken substantially on the line 10—10 of Figure 9, Figure 11 is a detailed fragmentary elevational view showing a modified form of plate, Figure 12 is a sectional view of the plate shown in Figure 11, Figure 13 is a vertical sectional view showing still another form of controlling means of my invention, Figure 14 is a vertical sectional view taken substantially on the line 14—14 of Figure 13, Figure 15 is a vertical sectional view showing still another form of the device of my invention, Figure 16 is a transverse vertical sectional view taken substantially on the line 16—16 of Figure 15, Figure 17 is a detail view showing one element of the construction illustrated in Figures 15 and 16, Figure 18 is a vertical sectional view showing another form of my invention, Figure 19 is a vertical transverse sectional view taken substantially on the line 19—19 of Figure 18.

I have illustrated the device of my invention as applicable to a brake control system for automotive vehicles, but it is to be understood that I contemplate the use of my invention in any mechanism where the same may be found to have utility therein.

Referring to the drawings in detail, particularly Figure 1, I have illustrated somewhat diagrammatically a chassis of an automotive vehicle comprising essentially a frame 5, axles 6, wheels 7, a prime mover or engine 8 arranged in the conventional manner. Arranged immediately to the rear of the engine 8 is a transmission 9, a drive connection 10 to the rear wheels, the connection 10 carrying a brake drum 12 which in the embodiment illustrated comprises a braking mechanism of the so-called emergency type and with which for practical illustration I have incorporated my invention. Associated with wheels 7 are individual brakes 14 which are connected by means of rods 15 and 16 to a transverse operating shaft 17 which is in turn connected by link 18 to a service brake pedal 19 or other suitable operating means, but if desired the control mechanism of my invention may be associated with the latter described braking system.

One form of the control mechanism of my invention is particularly illustrated in Figures 2 through 6, inclusive, being connected to a brake band 21 through the medium of a "pull" or extension rod 22, a bell crank lever 23 and link 24 to a pin 25 carried by the brake operating or control mechanism. This lever mechanism comprises a pair of similar plates 28 and 29 which are spaced apart by means of a plate 30, all the plates being held in unitary relationship by means of rivets 32 or other suitable means. The plates 28 and 29 are provided with concentric openings which receive a bushing 34 being keyed as at 35 or otherwise secured to a cylindrical projection or stud 36 which may be an integral part of the transmission housing wall or may be otherwise secured to some convenient portion of the vehicle. The stud 36 is provided with a reduced threaded portion 38 which accommodates a washer 39 and a nut 40 for holding the bushing 34 and associated mechanism on the stud. The plates 28 and 29 are also provided with a cut-away portion 42 within which is positioned a cylindrical member or roller 43, one wall 44 of the cut-away portions 42 being angularly related so as to direct the cylindrical member 43 into wedging engagement with the said wall and the periphery of the bushing 34 when the plates 28 and 29 are moved in one direction with respect to the fixed bushing 34. I have provided an expansible spring 46, one end of which is received into an opening 47 in the centrally positioned spacer plate 30, to continuously urge the clutch roller 43 into contact with the angular wall 44 and the periphery of bushing 34.

The plates 28 and 29 are formed with depending portions 48 and 49 which have registering openings 50 adapted to receive the pin 25 for connecting the control mechanism to the braking mechanism or other apparatus.

The operating means for moving the plates 28 and 29 hereinbefore described consists of a handle or operating member or lever element 52 which extends into an opening or cut-away portion of the plate 30 between the plates 28 and 29. The member 52 is provided with an elongated slot 53 through which projects a pivot pin 54, the latter serving to retain the handle or control member 52 in operative yet lost motion engagement with the plates 28 and 29 for a purpose to be hereinafter explained. Pivoted adjacent the lower extremity of the member 52 upon a pivot pin 56 carried by plates 28 and 29 is a movable release or pawl member 57 formed with a transversely extending portion 58 which is at all times aligned in parallelism with the axis of the cylindrical roller 43. The lever or handle member 52 in the embodiment illustrated is capable of being manually operated to two positions respectively illustrated in Figures 3 and 5. In the normal position shown in Figure 3, the lower end of the handle or operating member 52 is in the path of a portion of the releasing member 57. In order to prevent ready displacement or inadvertent movement of the handle member I have provided a retaining ball 60 which is held in engagement with one of two notches 61 and 62 in the handle member 52 by means of an expansible spring 63 retained in a bore 64 in the spacer plate lever 30.

In the operation of the device of my invention, referring particularly to Figures 2 to 5, inclusive, to initiate the operation of the brake operating mechanism, the operating or lever handle 52 is moved in a counter-clockwise direction carrying plates 28, 29 and associated mechanism causing a movement of link 24, oscillation of bell crank lever 23 to brake setting position, i. e., drawing the brake band 21 into close frictional engagement with the brake drum 12.

When the mechanism has been moved in a counter-clockwise direction to brake setting position, the cylindrical or clutch member 43 is wedged under the influence of spring 46 into close frictional engagement between the periphery of the bushing 34 and the angular walls 44 of the members 28 and 29 creating such frictional engagement as will prevent the return of the plates 28 and 29 and mechanism carried thereby to brake releasing position. The wedging engagement is of such nature that a disruption of the parts will take place before the roller 43 will be dislodged from its wedged relation in brake setting position.

When it is desired to release the brake mechanism, a clock-wise movement of the handle member 52 is effected causing a slight rotation or lost motion of the handle member about its pivot pin 54 bringing the lower end thereof into contact with a portion of the releasing or bell crank member 57 swinging a portion 58 thereof into engagement with the roller 43 thus thrusting the latter in a clock-wise direction to release the same from wedging engagement between the periphery of the bushing 34 and the angular walls 44 thus permitting movement of the entire assembly to pivot about the stud shaft or support 36 to brake releasing position. It will be apparent from the foregoing explanation that a counter-clockwise movement of the handle 52 to any position will effect a locking engagement of the parts 43 against a possible release by any tension of the parts set up through the medium of the link 24 and brake mechanism per se and a release of the mechanism can only be effected by proper movement of the operating handle or lever 52.

Figures 3, 4:
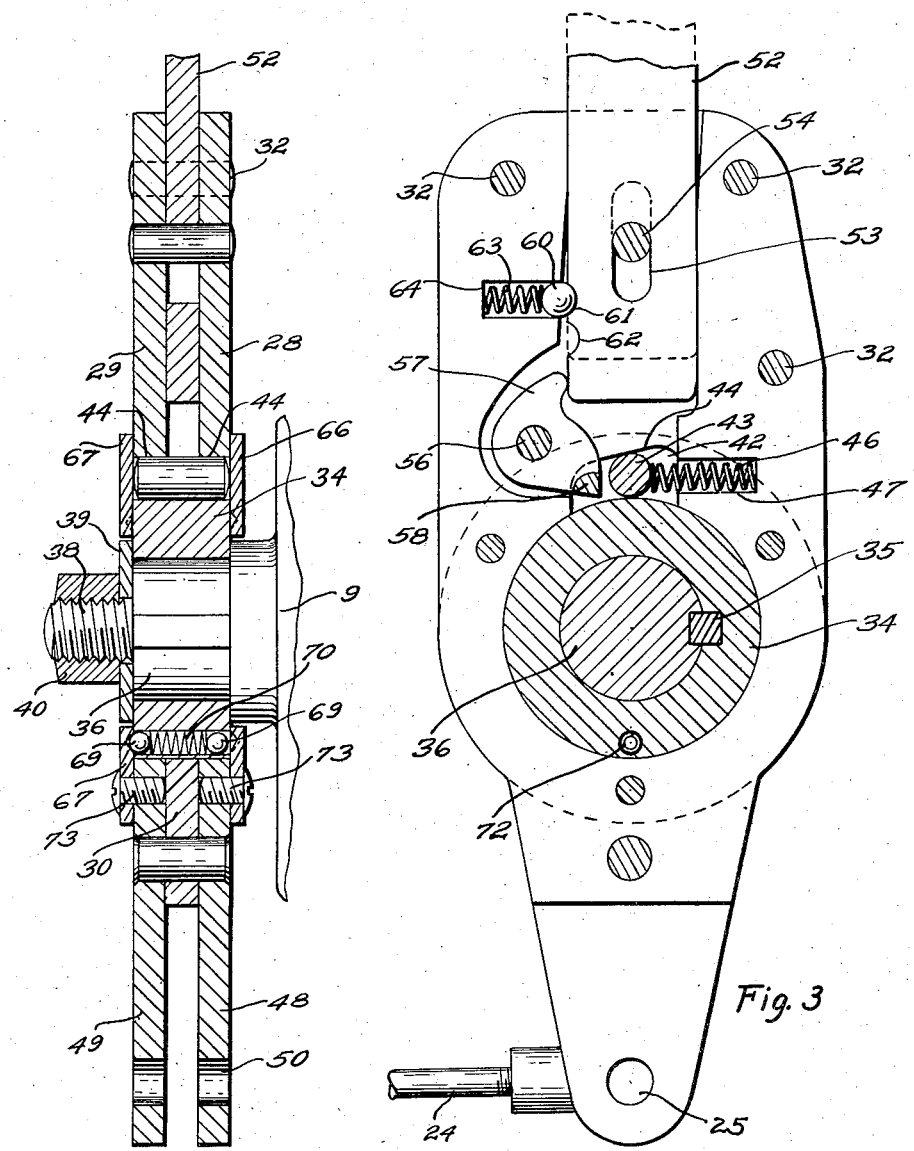

Under some circumstances it may be desirable to prevent the release of the mechanism by movement of handle 52, and to this end I have provided the operating lever or handle 52 with an elongated slot 53 which permits the lever to be moved upwardly until the locking ball 60 engages the lowermost serration 62 in the handle member 52 thus moving the lever out of the path of the releasing member 57 as shown in dotted lines in Figure 3. With the lever in this position the same will not operate when urged in a clockwise direction to release the locking mechanism as the lower-most portion of the lever is moved out of the path of the releasing member 57 so that no releasing of the parts can take place during the period in which the lever is located in its uppermost position. This is a very desirable feature in that the vehicle operator may inadvertently release this mechanism by accidental contact therewith and such a safeguard also is effective against the surreptitious meddling by children of the mechanism. In order to effect or release the mechanism it is only necessary to move the lever or handle 52 downward to the position illustrated in full lines in Figure 3 in which position the clockwise movement will cause locking mechanism to be released as shown in Figure 5 and hereinbefore described.

I have found it desirable to provide a frictional means of some form to afford smooth operation of the mechanism during release, thus preventing an intermittent "jerking action" which might arise by reason of the tension of the braking mechanism acting to cause the clutch member 43 to be periodically wedged and released because of the tendency of the mechanism to move swiftly to release position. To this end I have provided a plurality of annular members or plates 66 and 67 shown particularly in Figure 4, 9 and 10 inclusive, located on either side of the plates 28 and 29 and which are provided with indentations or spaced depressions 68 which are adapted to be progressably engaged by locking balls or members 69 which are held in engagement with the plate by means of an expansible spring 70 interposed therebetween, the balls and spring being received in an aperture 72 in the bushing 34. The plates 66 and 67 are held in position by means of retaining screws or members 73. The depressions in plate 66 are not in aligned relation with the depressions in the plate 67 so that a movement of locking assembly causes the ball 69 to alternatively engage the depressions in the said plates thus setting up substantially continuous frictional engagement which prevents any "quick" return of the control mechanism to brake releasing position upon clockwise movement of the handle member 52. In Figures 11 and 12 I have illustrated a plate similar to that shown in Figures 9 and 10 with the depressions 68 formed by stamping the sheet metal plate with a tool formed of a series of projections.

In the form of my invention illustrated in Figures 7 and 8, the handle or operating member 52' is arranged at one side of the bushing 34'; the lower extremity of the handle member 52' when in its lower-most position being arranged to contact with a clutch releasing pin 11' to cause a disengagement of the locking roller or member 43' when the handle member 52' is moved in a counter-clockwise direction. When the handle member 52' is moved bodily upwardly to bring the locking ball 60' into engagement with the lowermost serration or depression 62' in the operating member, the lower extremity of the operating member is moved out of the path of engagement with the pin 11' as indicated by dotted lines in Figure 8, thus preventing any inadvertent releasing of the mechanism. This form of my invention operates in substantially the same manner as the first embodiment hereinbefore described.

In the form of the invention illustrated in Figures 13 and 14, the structure comprises essentially a pair of spaced plates 80 and 81 which are fixedly secured together by means of rivets 82, these plates carrying a pivot pin 84 which is adapted to be connected by means of a link 85 to the braking mechanism of the vehicle. Fixedly secured to the transmission housing of the vehicle or other suitable supporting means is a bracket or member 87 having a curved or arcuate upper surface 88. A plate 83 interposed between the plates 80 and 81 is provided with an aperture having an angularly arranged upper wall 89 and a retaining or clutch member 90 is adapted to be wedgingly engaged between the angular wall 89 and the arcuate surface 88 of the bracket 87 when the mechanism is moved to locking position as illustrated in a counter-clockwise direction.

The release means is similar to the other forms of the invention hereinbefore described wherein a clockwise movement or a lever or operating member 92 brings the extremity thereof into engagement with a bell crank member 93 which in turn contacts with a releasing pin 94 to move the roller 90 out of wedging engagement with the bracket 87 and the angular wall 89 of the plate 83. In order to prevent inadvertent release of the mechanism, the lever 92 may be moved upwardly as hereinbefore described in connection with the other forms of the invention previously described.

In the form of my invention illustrated in Figures 15 through 17, inclusive, a case enclosing the mechanism is formed of two flanged plates 101 and 102 within which is positioned a substantially rectangular plate 103 formed with a depending portion 104 having an opening 105 to facilitate the connection of a brake operating rod thereto, this assembly forming a brake operating lever. The plate 103 is provided with a centrally positioned circular opening which receives a disc-like member 106 having an irregular shaped opening 107 therein which receives a tenon (not shown) which may form a part of the wall of the transmission casing or other supporting means (not shown) forming a part of the vehicle. At all times during the operation of the device the disc 106 is held in rigid relationship with respect to the supporting element.

The plate 103 is provided with an opening 108 having an angularly arranged wall 109, the opening 108 adapted to accommodate a cylindrical roller or clutch element 110. The plates 101 and 102 are provided with embossed or raised portions 112 and 113 which accommodate the extremities of the clutch member and also the parallel portions 114 and 115 of a substantially U-shaped member 116, the extremities of the portions 114 and 115 having openings to accommodate the ends of the clutch member 110. The plate 103 is provided with a rectangular notch or serration 117 which accommodates an expansible spring 119, the latter engaging the bight portion of the U-shaped member 116 thus constantly urging the clutch member 110 into clutching or wedging engagement with the wall 109 of plate 103 and the periphery of disc 106.

Extending into an opening within the casing formed by the plates 101 and 102 is a lever or handle member 120 preferably of tubular construction which is mounted for pivotal movement upon pin 121; the arrangement of the lever member in the embodiment shown being such that a counter-clockwise movement of the lever will effect a setting of the brakes, the parts being retained in an adjusted position by means of the clutch element 110. The mechanism is released in substantially the same manner as hereinbefore described with respect to the other modifications of the invention disclosed, i. e., a clockwise movement of the lever member 120 about the pivot pin 121 operates to bring a projection 122 formed on the lower extremity of the lever into engagement with the bight portion of the spring of the U- shaped member 116 to move the clutch member 110 out of engaging position.

In this form of the invention it will be noted that all the parts may be easily and inexpensively formed of sheet material. The mechanism may be "locked" by an upward movement of the handle member 120 to bring the lowermost extremity of an elongated slot 123 in the handle member into contact with the pivot pin 121, which movement raises the projection 122 out of the path of the member 116 so that any clockwise movement of the lever will not cause a release of the mechanism.

In the form of my invention illustrated in Figures 18 and 19, a casing acting as a lever element is formed of two oppositely disposed plates 130 and 131, these plates being formed with a circular portion which receives a centrally positioned disc-like member 132 having a depending leg 133, the leg having an opening 134 for attachment to a brake operating rod or other mechanism. Positioned on either side of the plate 132 are disc-like members 136 and 137 having integrally formed inwardly turned ears 138 which are arranged in the path of a member 139 mounted for pivotal movement on a pin 140. The upward portion of member 139 is arranged in the path of the lower extremity of a handle member 141 which is pivotally supported upon a pin 143 as in the other forms of the invention hereinbefore described.

The centrally positioned disc 132 is provided with diametrically opposed serrations or cutaway portions 144 and 145 which accommodate clutch member 146 and 147 which are adapted for clutching engagement between the periphery of a supporting disc 148 which may be secured to the transmission casing or other suitable supporting means and the angular walls of the serrations 144 and 145 in the disc 132. The clutch members 146 and 147 are urged into locking position by means of expansible springs 150 and 151. The discs 136 and 137 are provided with aligned openings to receive or accommodate the extremities of the clutch members 146 and 147. Thus a clockwise movement of the operating handle 141 about the pivot pin 142 oscillates member 139 into engagement with the ears 138 thus rotating the discs 136 and 137 carrying with them the clutch members or rollers 146 and 147 out of wedging engagement with the walls of the disc 132 and the supporting member 148, which effects a release of the mechanism so that the entire assembly carried by the plates 130 and 131 may be moved in a clockwise direction. With an arrangement of this character wherein the clutch members are diametrically arranged the stresses set up acting upon the supporting member are more nearly equalized and balanced.

It should be noted that in the forms of the invention herein illustrated the operating members for the lever structure are carried upon pivot pins so as to have lost motion with the supporting structure. This arrangement has advantages in that it has been found that in a construction of this character that the secondary or harmonic vibrations of the vehicle caused by out-of-balance conditions of the motor or shocks set up by road irregularities cause a constant sympathetic or synchronous vibration of brake lever operating mechanism.

In the form of my invention disclosed herein I have found that pivoting the lever member so as to have lost motion with respect to its supporting structure substantially reduces the vibration of the handle member to a minimum, and in some instances of installation the vibratory movements of the handle member are entirely eliminated. This arises by reason of the fact that the vibration of the lever structure of the braking mechanism of my invention is separate from the handle member. Thus the inertia of the handle member is sufficient to prevent sympathetic vibration of the latter with other vibrating parts of the vehicle. Moreover, I have found that the lost motion mounting of the handle member does not create a rattling of the parts but on the contrary no clicking or obnoxious noises arise from this method of mounting.

It is apparent that, within the scope of the invention modifications and different arrangements may be made other than is herein disclosed, and the present disclosure is illustrative merely, the invention comprehending all variations thereof.

What I claim is:

1. In a device of the character disclosed, in combination, a lever having relatively movable portions; friction locking mechanism for one of said lever portions; means whereby the movement of one of the portions of said lever releases said locking mechanism, and means retarding movement of said lever during releasing operation.

2. In combination, cylindrical supporting means; a relatively movable member journalled upon said supporting means; a cylindrical locking member interposed between said supporting means and said member; means for urging said cylindrical member into locking position; an operating lever having lost motion connection with said member; means interposed between said clutch member and said lever and engageable with said clutch member for releasing latter, and means whereby movement of said lever independent of said member renders said releasing means ineffective.

3. In combination a cylindrical supporting member; a lever element journalled upon said supporting member; a clutch element interposed between the surface of said cylindrical supporting member and a portion of the lever element; a handle member having slidable connection with said lever element; means whereby lateral movement of said handle member effects a release of said clutch element, said handle member being capable of longitudinal slidable movement for rendering ineffective a release of the clutch member.

4. In combination, a lever element; a supporting shaft therefor; a cylindrical bushing interposed between said lever element and said shaft; a clutch roller interposed between said cylindrical member and said lever element; a releasing means for said clutch member; a handle portion movably supported with respect to said lever element and positioned to actuate said clutch releasing means, said handle portion being capable of movement to a position out of engagement with the clutch releasing means; and frictional means for retarding movement of said lever element in either direction.

5. In combination, a lever element comprising a pair of spaced plates; a cylindrical supporting member for said lever element; a friction clutch interposed between said support and said lever element; a handle member having a portion projecting between said plates for operating the lever and for releasing said clutch means, said handle member being movable out of engagement with the clutch releasing means.

6. In combination, a lever having a body portion and a handle portion, said body portion consisting of two substantially matched half sections of sheet material; means for securing said sections together; a support for said body portion; and clutch means interposed between said body portion and said support for retaining the lever in adjusted position.

7. In combination, a lever having a body portion and a handle portion, said body portion consisting of two substantially matched half sections of sheet material; means for securing said sections together; a support for said body portion; clutch means interposed between said body portion and said support for retaining the lever in adjusted position; and means associated with said handle portion for effecting a release of said clutch means.

8. In combination, a lever having a body portion and a handle portion, said body portion consisting of two substantially matched half sections of sheet material; means for securing said sections together; a support for said body portion; clutch means interposed between said body portion and said support for retaining the lever in adjusted position; means associated with said handle portion for effecting a release of said clutch means; and friction means for retarding the movement of said lever in either direction.

SAMUEL A. SNELL.